United States Patent
Yuo et al.

[11] Patent Number: 5,933,950
[45] Date of Patent: Aug. 10, 1999

[54] METHOD OF FASTENING INTAKE MANIFOLD IN INTERNAL COMBUSTION ENGINE HAVING TWO CYLINDER BANKS

[75] Inventors: Keiichi Yuo; Masahiko Watanabe, both of Kanagawa-ken, Japan

[73] Assignee: Nissan Motor Co., Ltd., Kanagawa-ken, Japan

[21] Appl. No.: 08/892,537

[22] Filed: Jul. 14, 1997

[30] Foreign Application Priority Data

Jul. 15, 1996 [JP] Japan ..................................... 8-185154

[51] Int. Cl.$^6$ ....................................................... B23P 15/00
[52] U.S. Cl. ...................... 29/888.01; 29/888; 123/193.3
[58] Field of Search ................ 29/888.01, 888, 29/888.011, 525.1; 123/193.3

[56] References Cited

U.S. PATENT DOCUMENTS 4,887,341  12/1989  Sakimori et al. ..................... 29/888.01
5,743,011   4/1998  Dickerson et al. ................... 29/888.01

FOREIGN PATENT DOCUMENTS 6-346782  12/1994  Japan .

*Primary Examiner*—Irene Cuda
*Attorney, Agent, or Firm*—McDermott, Will & Emery

[57] ABSTRACT

A method of fastening an intake manifold to cylinder heads of an internal combustion engine having two cylinder banks in order to reduce the deformations of cylinder bores in the cylinder heads. The method includes steps of (1) temporarily fastening the cylinder heads to the cylinder block using cylinder head bolts with a fastening torque of 1.0 kgfm (9.8 Nm), (2) temporarily fastening the intake manifold to the cylinder heads using intake-manifold bolts with a fastening torque of 1.6±0.1 kgfm (15.7±0.98 Nm), (3) loosening the fastening torque of the int-manif. bolts up to 0 kgfm (0 Nm; see h of FIG. 3), (4) fixing the cylinder heads to the cylinder block using the cylinder head bolts with a fastening torque of e.g. 3.0 kgfm+60° (29.4 Nm+60°) and (5) fixing the intake manifold to the cylinder heads using the intake-manifold bolts with a fastening torque of 0.9±0.1 kgfm (8.8±0.98 Nm).

6 Claims, 7 Drawing Sheets

○ STD. ASSY. METHOD
● INT-MANIF. STEP-FAS. ASSY. METHOD

○ STD. ASSY. METHOD
● INT-MANIF. STEP-FAS. ASSY. METHOD

METHOD OF FASTENING INTAKE MANIFOLD IN INTERNAL COMBUSTION ENGINE HAVING TWO CYLINDER BANKS

BACKGROUND OF THE INVENTION

The present invention relates to a method of assembling an intake manifold to an internal combustion engine having two cylinder banks. More particularly, it relates to a method of fastening the intake manifold to cylinder heads while using a technique for reducing each deformation of cylinder bores formed in the cylinder heads of the internal combustion engine.

Hitherto, as for the mounting of one or more cylinder heads on a cylinder head of the internal combustion engine, a problem of piston slap noise has been caused during the engine's operation since the cylinder bores is deformed by a fastening force (an axial force) applied on cylinder head bolts for fastening the cylinder head. Note, the cylinder head bolts will be also referred to as "head bolts", hereinafter.

In order to reduce such a deformation of the cylinder bores, for example, rib or bridge structures for reinforcing the cylinder block are disclosed in Japanese Unexamined Patent Publications (kokai) Nos. 58-13256 and 6-346782.

However, it is coming to light that, in the internal combustion engine where the intake manifold is interposed between a left cylinder bank and a right cylinder bank, such as in a V-type engine having two cylinder banks arranged in a substantial V form, the deformation of the cylinder bores is caused by not only the fastening force applied to the head bolts but another fastening force applied to bolts used to mount the intake manifold to the cylinder heads.

It should be noted that, due to variations in machining accuracy and assembling accuracy of the cylinder heads etc., respective fitting surfaces of the intake manifold and the cylinder heads in the V-type engine are not always parallel with each other. Thus, in the conventional fastening method of the intake manifold, the intake manifold has been displaced by making use of the fastening force exerted on the bolts for fastening the intake manifold to the cylinder heads, thereby adhering the fitting surfaces to each other in order to ensure the sealing performance therebetween. Consequently, as shown in FIG. 1, an action line of a force F of an intake manifold 1, due to the urging of a cylinder head 2 when assembling the intake manifold 1, is out of alignment with another action line of a frictional force f (reaction force of F) of the cylinder head 2, so that a rotational moment (couple of forces) M is produced that is exerted on the cylinder head 2. Further, since an outer wall of a cylinder block 3 is urged outward, together with the moving cylinder head 2 by the rotational moment M, cylinder bores are deformed in a thrust direction (see FIGS. 2A and 2B). Additionally, not only is the fastening force providing the surface pressure for ensuring the sealing performance of the fitting surfaces, but also the fastening force for displacing the cylinder head 2 is applied on an intake manifold bolt 4 for fastening the intake manifold 1 to the cylinder head 2. Consequently, such an application of the fastening forces on the intake manifold bolt 4 causes female threaded portions in bolt-holes formed on the cylinder head 2 to be further deformed, thereby increasing the deformation of the cylinder bores.

In order to reduce such a deformation of the cylinder bores, it is suggested to further reinforce the cylinder block by means of ribs or the like. Such reinforcement, however, would cause the weight of the cylinder block to be increased and would require modification of the present design of the cylinder block.

SUMMARY OF THE INVENTION

It is therefore an object of the present invention to provide a method of fastening the intake manifold, which is capable of decreasing the deformations of the cylinder bores if only changing an order of operations to fasten the intake manifold.

The object of the present invention described above can be accomplished by an intake manifold fastening method for an internal combustion engine having two cylinder banks where the internal combustion engine includes a cylinder block having cylinders formed therein, cylinder heads which are attached to the cylinder block for partially defining combustion chambers therein, an intake manifold which is mounted on the cylinder heads for distributing intake air into the cylinders, a plurality of cylinder head bolts for fastening the cylinder heads to the cylinder block and a plurality of intake manifold bolts for fastening the intake manifold to the cylinder heads. The method comprises the steps of:

temporarily fastening the intake manifold to the cylinder heads by the intake manifold bolts on condition that the cylinder heads are temporarily fastened to the cylinder block by the cylinder head bolts; and thereafter, formally fastening the intake manifold to the cylinder heads by the intake manifold bolts after the cylinder heads are formally fastened to the cylinder block by the cylinder head bolts.

With the above-mentioned method, since the temporary fastening of the intake manifold bolts is carried out while the cylinder heads are temporarily fastened to the cylinder block by the cylinder head bolts, the cylinder heads are displaced on condition that the rotational moments about the cylinder heads are decreased at the time of temporary fastening the intake manifold, so that the fitting surfaces between the intake manifold and the cylinder heads are parallel with each other. Thereafter, since the formally fastening of the intake manifold to the cylinder heads is executed after the cylinder heads are formally fastened to the cylinder block by the cylinder head bolts, the unnecessary fastening force can be abolished thereby reducing the deformations of the cylinder bores. Further, with the reduction of deformations of the cylinder bores, it is possible to reduce a noise level of the piston slap and respective amounts of oil consumption and blow-bye gas.

Furthermore, for example, in the engine where a cylinder gasket is interposed between each cylinder head and the cylinder block, owing to its improved sealing performance, it is possible to replace the conventional gasket with a low-priced gasket, whereby a production cost of the engine will be reduced in comparison with that of the conventional engine.

In the above-mentioned method, preferably, the intake manifold bolts are once loosened after temporarily fastening the intake manifold to the cylinder heads by the intake manifold bolts and before formally fastening the cylinder heads to the cylinder block by the cylinder head bolts.

In this case, since the intake manifold bolts are once loosened after temporarily fastening the intake manifold to the cylinder heads by the intake manifold bolts, the rotational moment derived from the fastening force displacing the cylinder head can be reduced thereby decreasing the deformations of the cylinder bores.

In addition, it is also preferable that a first fastening force for temporarily fastening the cylinder head bolts is established smaller than a second fastening force for formally fastening the cylinder head bolts, while a third fastening force for temporarily fastening the intake manifold bolts is established larger than a fourth fastening force for formally fastening the intake manifold bolts and wherein the third fastening force is established so as to allow positioning of the cylinder heads relative to the cylinder block and positioning of the intake manifold relative to the cylinder heads in opposition to surface pressures between the cylinder block and the cylinder heads due to the first fastening force.

In such a case, since the positioning of the cylinder heads and the intake manifolds is carried out at the time of temporary fastening of the intake manifold bolts, the rotational moment derived from the fastening force displacing the cylinder head can be reduced thereby decreasing the deformations of the cylinder bores.

In the present invention, preferably, the internal combustion engine is a V-type engine where the two cylinder banks are arranged in a substantial V form. In this case, even if the intake manifold arranged between the left and right cylinder heads becomes compact so that the rigidity is increased, it is possible to reduce the deformation of the cylinder bores effectively.

Alternatively, it is preferable that the internal combustion engine is a parallel-type engine where the two cylinder banks are arranged to be substantially parallel to one another. Also in this case, even if the intake manifold arranged between the two cylinder banks becomes compact so that the rigidity is increased, it is possible to reduce the deformation of the cylinder bores effectively.

Furthermore, the object described above can be accomplished by a method of fastening an intake manifold to cylinder heads of an internal combustion engine having two cylinder banks where the engine includes a cylinder block having cylinders formed therein, the cylinder heads attached to the cylinder block for partially defining combustion chambers therein and the intake manifold mounted on the cylinder heads for distributing intake air into the cylinders. The method comprises the steps of:

temporarily fastening the intake manifold to the cylinder heads by the intake manifold bolts on condition that the cylinder heads have been temporarily fastened to the cylinder block; and thereafter, formally fixing the intake manifold to the cylinder head after the cylinder heads are formally fixed to the cylinder block.

Also in this case, since the temporary fastening of the intake manifold bolts is carried out while the cylinder heads are temporarily fastened to the cylinder block by the cylinder head bolts, the cylinder heads are displaced on condition that the rotational moments about the cylinder heads are decreased at the time of temporary fastening the intake manifold, so that the fitting surfaces between the intake manifold and the cylinder heads are parallel with each other. Thereafter, since the formally fastening of the intake manifold to the cylinder heads is executed after the cylinder heads are formally fastened to the cylinder block by the cylinder head bolts, the unnecessary fastening force can be abolished thereby reducing the deformations of the cylinder bores.

The above and other features and advantages of this invention will become apparent, and the invention itself will best be understood, from a study of the following description and appended claims, with reference to the attached drawings showing a preferred embodiment of the invention.

BRIEF DESCRIPTION OF THE DRAWINGS

FIGS. 2A and 2B are explanatory diagrams of the deformation of the cylinder bores cause by the conventional method of fastening the intake manifold, in which FIG. 2A shows the arrangement of the respective cylinders while FIG. 2B shows the periodical change of deformation of the cylinder bores;

DESCRIPTION OF THE PREFERRED EMBODIMENT

An embodiment of the present invention will be described with reference to the drawings.

Figure 3:
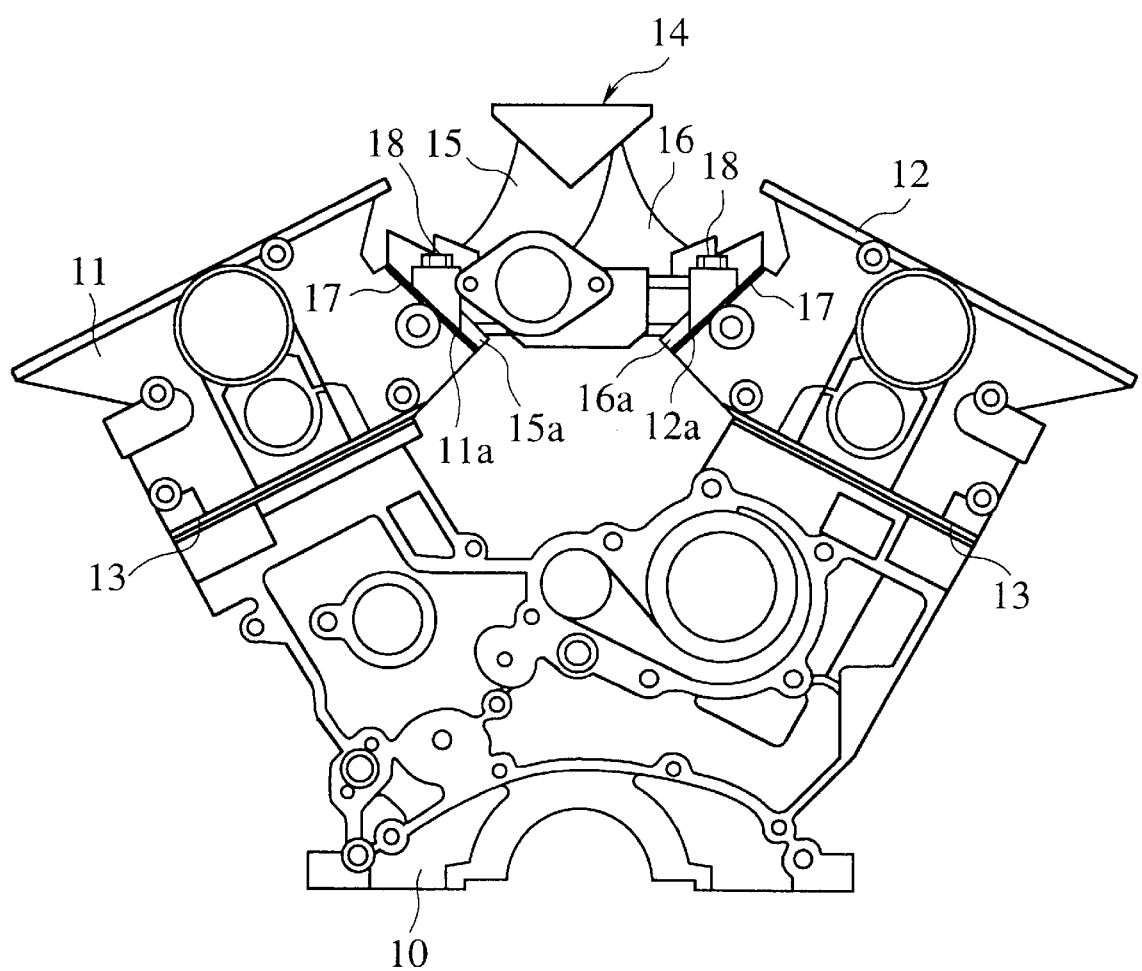
FIG. 3 shows an arrangement of the intake manifold of a general V-type engine.

FIG. 3 shows a mounting arrangement of an intake manifold in a general V-type engine structure. In the figure, a half-skirt type of cylinder block 10 is fastened to left and right cylinder heads 11, 12 through the intermediary of gaskets 13 by a plurality of head bolts which are not shown in the figure. The intake manifold 14 arranged between the left cylinder head 11 and the right cylinder head 12 includes left and right intake ports 15, 16 diverging from each other. The left and right intake ports 15, 16 have respective mounts 15a, 16a formed on leading ends thereof, for attachment with the left and right cylinder heads 11, 12, respectively. While, the cylinder heads 11, 12 are provided with respective mounts 11a, 12a for attachment with the intake manifold 14, respectively. In arrangement, the former mounts 15a, 16a of the intake manifold 14 are respectively jointed to the latter mounts 11a, 12a of the cylinder heads 11, 12 through the intermediary of gaskets 17 by a plurality of intake-manifold bolts 18. Note, the intake-manifold bolts 18 will be referred to as "int-manif". bolts", hereinafter.

Now, we describe a conventional or standard method of assembling the intake manifold to the cylinder heads and a new method of assembling the same in accordance with the present invention.

First of all, the standard assembling method comprises the following steps (1') and (2'):

(1') joining the cylinder heads to the cylinder block using the head bolts with a fastening (or clamping) torque of e.g. 3 kgfm+60° (29.4 Nm+60° ); and (2') joining the intake manifold to the cylinder head using the in-manif. bolts with a clamping torque of e.g. 2.0 (0.2 kgfm (19.4 (1.96 Nm).

Figure 1:
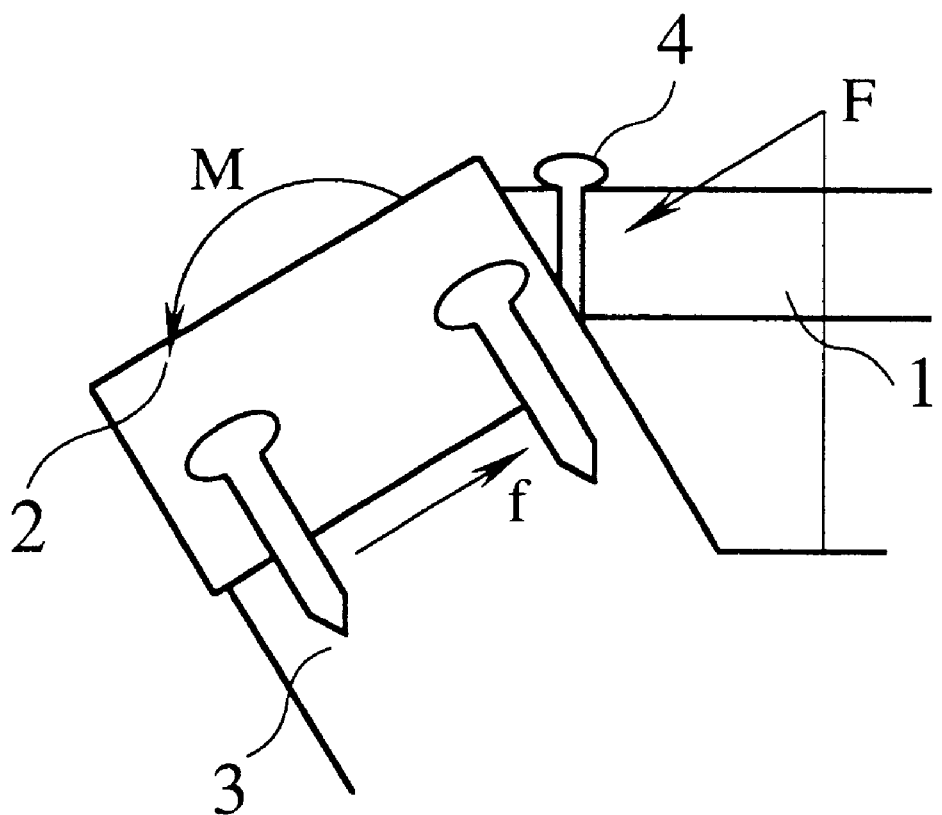
FIG. 1 is an explanatory conceptual view showing the cause of the deformation of the cylinder bores.
Figure 2A:
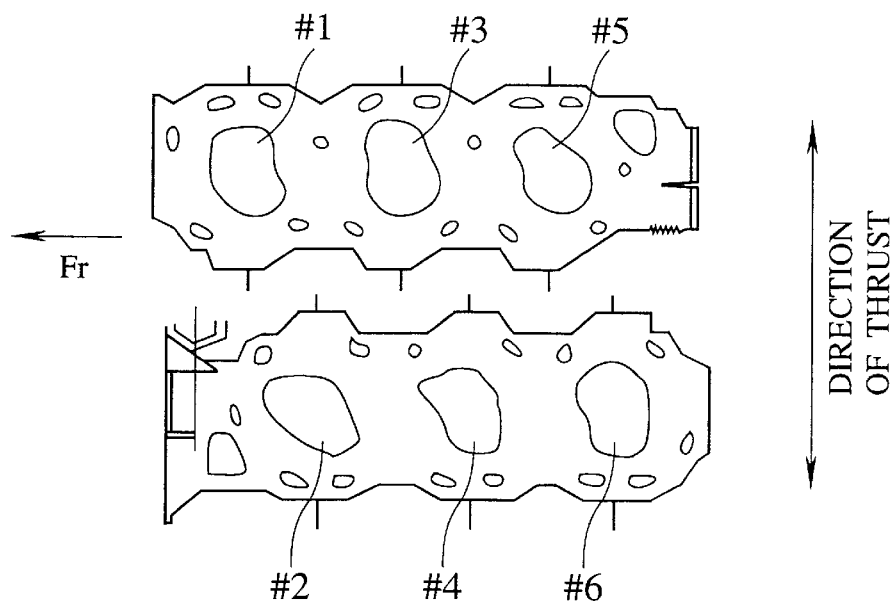
Figure 2B:
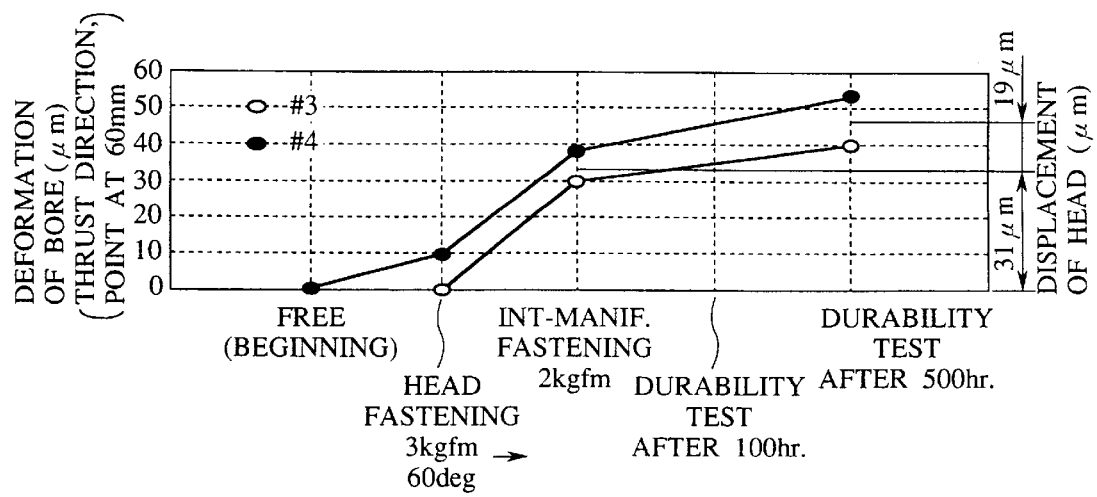

FIGS. 2A and 2B show experimental results regarding deformations of cylinder bores in the cylinder block assembled in accordance with the above conventional method. Providing that the deformation in the initial stage is zero, as shown in FIG. 2B, respective deformations of the cylinder bores of the cylinders #3 and #4 in the thrust direction amount to approximately 31 μm on average due to the fastening of the head bolts and the int.manif. bolts. The deformation of the cylinder bores is increased by the warming-up operation of an engine because of a difference in the coefficient of liner expansion between the cylinder block material (cast iron) and the cylinder head material (aluminum alloy).

Figure 4:
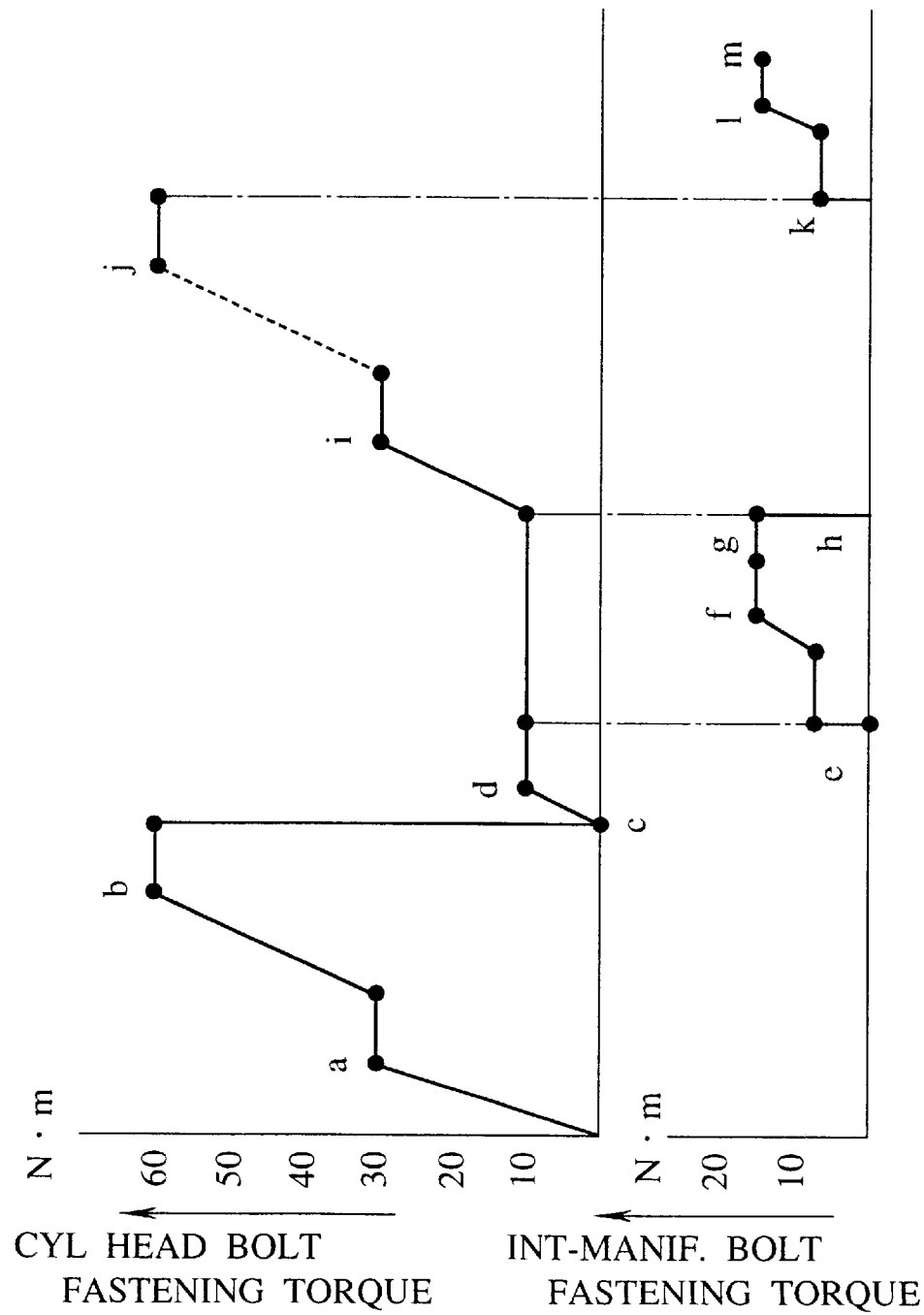
FIG. 4 is a diagram showing respective changes of torque required for fastening the cylinder head bolt and the intake manifold bolt, in accordance with an embodiment of the present method.

On the contrary, the assembling method of the present invention comprises the following steps (1) to (5) (see FIG. 4):

(1) temporarily fastening the cylinder head to the cylinder block by the head bolts preferably including two stages of burn-in fastening with a fastening torque of e.g. 3.0 kgfm (29.4 Nm) and 6.0 kgfm (58.8 Nm), loosening up to 0 kgfm (0 Nm) and temporary fastening by 1.0 kgfm (9.8 Nm) [first fastening force] in sequence (see a to d of FIG. 4);

(2) temporarily fastening the intake manifold to the cylinder head by the int-manif. bolts preferably including two stages of burn-in fastening by a fastening torque of e.g. 0.4 kgfm (3.92 Nm) and 1.6 kgfm (15.7 Nm) and temporary fastening by 1.6±0.1 kgfm (15.7±0.98 Nm) [third fastening force] in sequence (see e to g of FIG. 4);

Note: the above fastening torque of 1.6±0.1 kgfm (15.7±0.98 Nm) is established so as to allow positioning of the cylinder head relative to the cylinder block and positioning of the intake manifold relative to the cylinder head in opposition to the surface pressure between the cylinder block and the cylinder head temporarily fastened thereto at step (1).

(3) loosening the fastening torque of the int-manif. bolts up to 0 kgfm (0 Nm; see h of FIG. 4);

(4) fixing the cylinder head to the cylinder block using the head bolts with a fastening torque of e.g. 3.0 kgfm+60° (29.4 Nm+60°) [second fastening force] (see i to i of FIG. 4); and (5) fixing the intake manifold to the cylinder head using the int-manif bolts preferably including three stages of main fastening with a fastening torque of e.g. 0.4 kgfm (3.92 Nm), 0.9 kgfm (8.82 Nm) and 0.9±0.1 kgfm (8.8±0.98 Nm) [fourth fastening force] (see k to m of FIG. 4). The final fastening torque 0.95±0.1 kgfm (8.8±0.98 Nm) of the int-manif. bolts is the only fastening torque 0.9 kgfm (8.82 Nm) by which surface pressure can be produced for ensuring the sealing performance between the intake manifold and the cylinder head.

Figure 5:
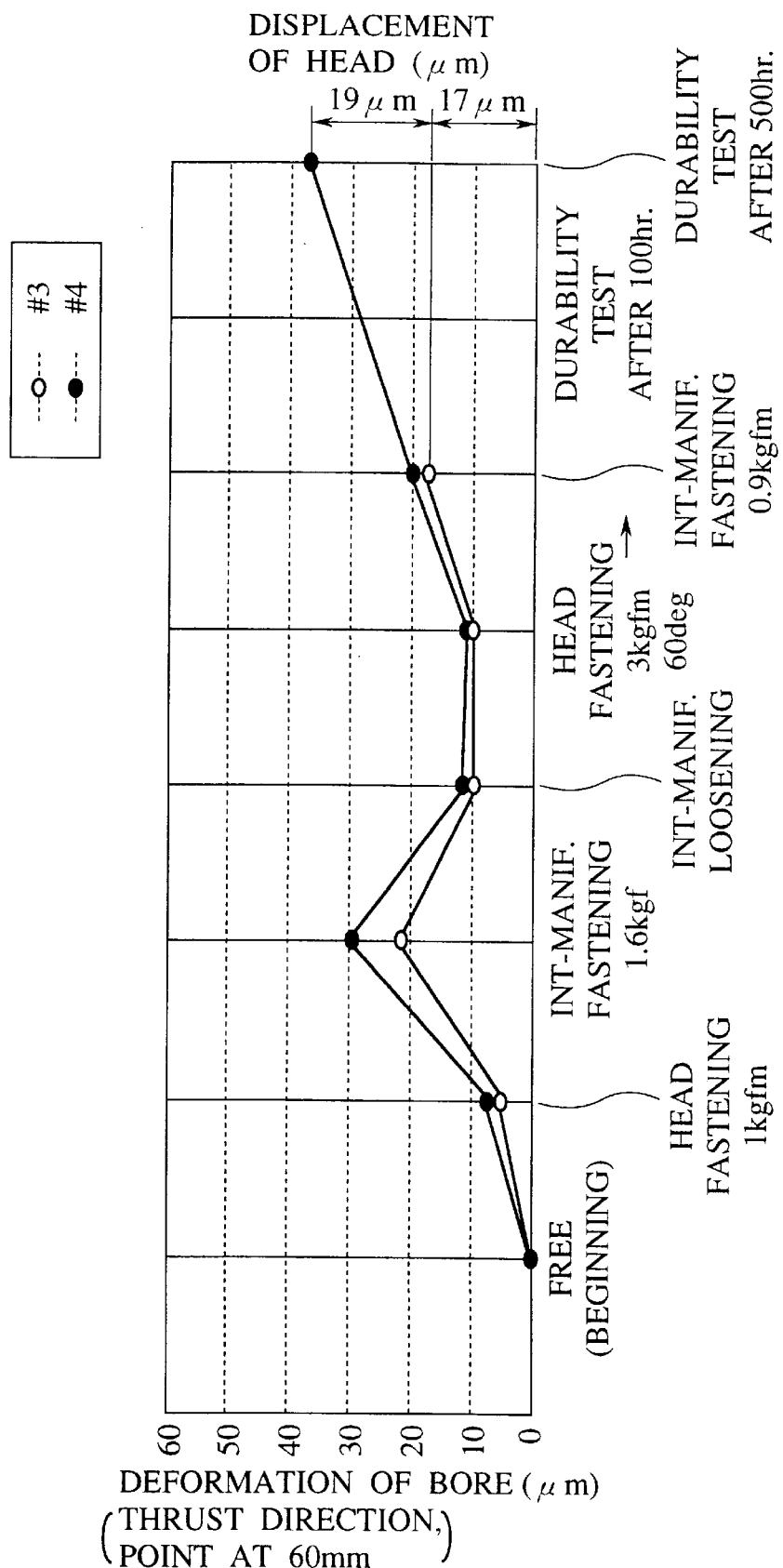
FIG. 5 is a diagram showing the periodical change of deformation of the cylinder bores in accordance with the present method of FIG. 4.

FIG. 5 shows a change of the deformation of the cylinder bores, in accordance with the method of the invention. From the figure, it will be understood that, providing that the deformation amounts at the beginning are set to zero respectively, an average of final deformation amounts of cylinders #3, #4 in the thrust direction amounts to approximately 1.7 μm by the respective steps of: temporary fastening of the head bolts (process 1); temporary fastening of the intake manifold bolts (process 2); loosening of the int-manif. bolts (process 3); formal fastening of the head bolts (process 4); and formal fastening of the intake manifold bolts (process 5). Note that, although this deformation amount of approximately 1.7 μm is also increased by the warming-up of the engine, the description of reason will be deleted for its similar to that of the conventional (STD.) fastening method.

Therefore, the deformation amount of the cylinder bore of V-type engine amounts to 31 μm in the STD. fastening method, while the same amounts to 17 μm in the int.manif. step-fastening method of the invention.

Next, we describe the experimental data showing the difference in operation and effect between the STD. fastening method and the int.manif. step-fastening method.

Figure 6:
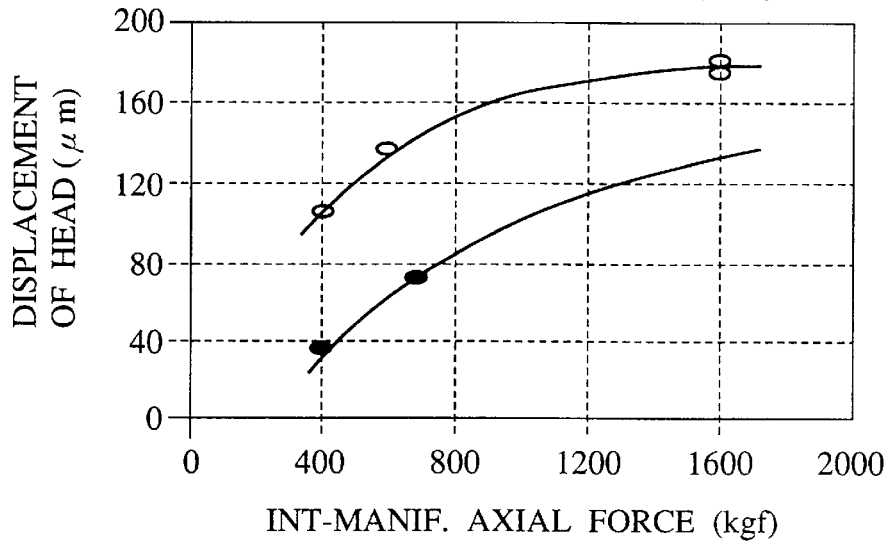
FIG. 6 is a diagram showing a relationship between an axial force of the intake manifold bolt and a displacement of the cylinder head.

FIG. 6 shows a relationship between the axial force [kgf] of the int.manif. bolt and a displacement [μm] of the cylinder head correlating closely with the deformation of the cylinder bore. From the figure, it will be found that the STD. fastening method and the int.manif. step-fastening method exhibit characteristic curves which are substantially parallel with each other. This figure represents that the displacement of the cylinder head increases as the int.manif. bolts are astened, while the displacement is not influenced by other factors, such as an assembling order in the engine.

Figure 7:
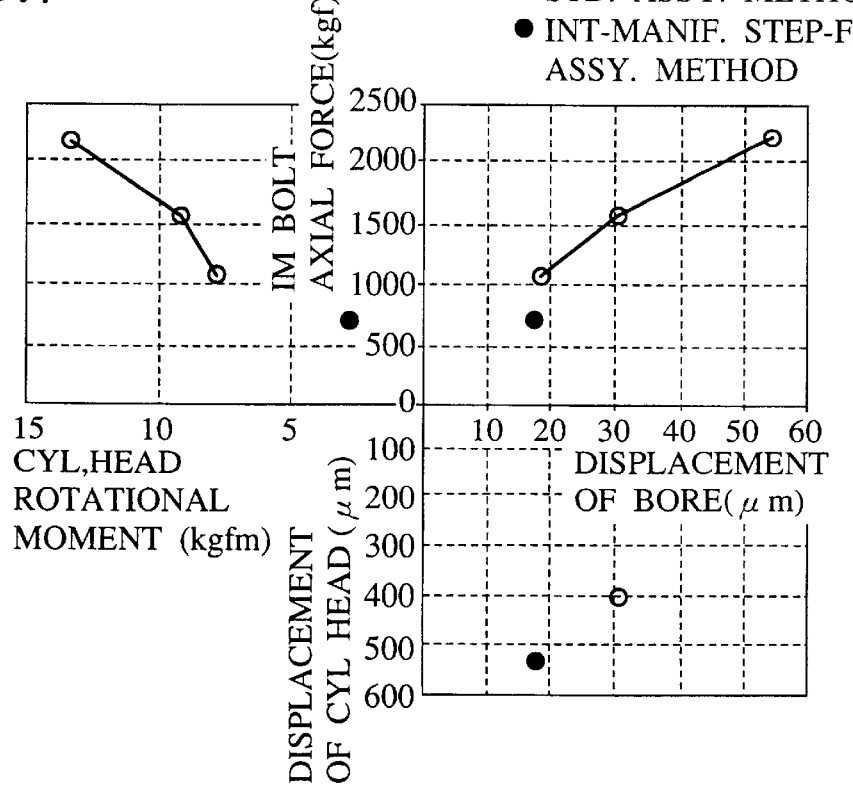
FIG. 7 is a diagram showing respective relationships among the axial force of the intake manifold bolt, the displacement of the cylinder head, the rotational moment on the cylinder head and the deformation of the cylinder bore.

FIG. 7 shows relative relationships among the axial force [kgf] of the int.manif. bolt, the displacement of the cylinder head [μm], the rotational moment applied to the cylinder head [kgfm] and the displacement of the cylinder bore [μm]. From this figure, it will be understood that according to the intake manifold step-fastening method of the invention, the axial force of the int.manif. bolt, the rotational moment applied and the displacement of the cylinder bore can be reduced respectively, despite the increased displacement of the cylinder head.

The reasons why the above-mentioned operation and effect are realized are as follows.

According to the invention, after temporarily fastening the cylinder heads to the cylinder block by the cylinder head bolts, the int.manif. bolts are fastened temporarily with the fastening torque which allows the cylinder heads to be positioned relative to the cylinder block and the intake manifold to be positioned relative to the cylinder heads in opposition to the surface pressures between the cylinder block and the cylinder heads. Therefore, the cylinder heads are displaced while reducing the rotational moment applied thereon, so that the fitting surfaces between the intake manifold and the cylinder heads become parallel with each other.

In addition, there is no need to fasten the int.manif. bolts into the intake manifold with such a fastening torque as allowing the cylinder heads to move in opposition to the surface pressure produced after the formal fastening of the cylinder head bolts, which has been required for the conventional STD assembling method. Thus, it is possible to reduce the deformation of the female threaded portions for the cylinder head bolts formed in the cylinder heads, whereby the deformations of the cylinder bores can be decreased.

Figure 8:
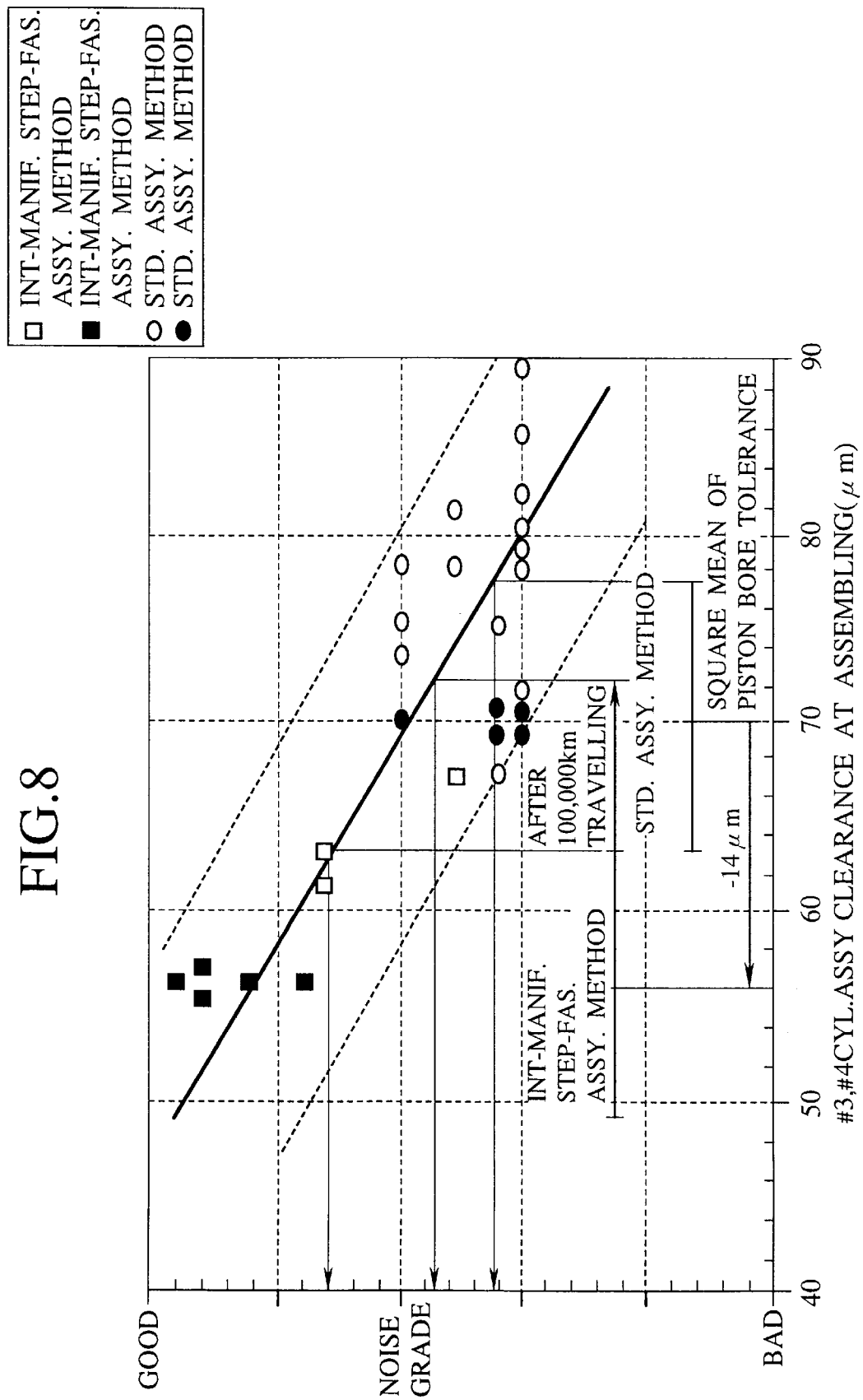
FIG. 8 is a diagram showing respective relationships between noise grades and clearances at assembling, in accordance with the present method and the conventional method.

Further, with the above-reduction of deformations of the cylinder bores, the noise level of the piston slap can be reduced to improve the noise grade as shown in FIG. 8, thereby providing a silent engine. Further, it is possible to reduce the respective amounts of oil consumption and blow-bye gas.

Although the above-mentioned embodiment is concerned with the Vtype engine, the present method is also applicable to the other engines having two cylinder banks, such as a horizontally opposed-piston engine, a parallel engine having parallel cylinder banks, which may be called "square four" or "tandem-twin" in motorcycles, and so on.

Finally, it will be understood by those skilled in the art that the foregoing description is of preferred embodiments of the disclosed fastening method, and that various changes and modifications may be made to the present invention without departing from the spirit and scope thereof.

What is claimed is:

1. A method of fastening an intake manifold to cylinder heads of an internal combustion engine having two cylinder banks, said engine including a cylinder block having cylinders formed therein, said cylinder heads attached to said cylinder block for partially defining combustion chambers therein, said intake manifold mounted on said cylinder heads for distributing intake air into said cylinders, a plurality of cylinder head bolts for fastening said cylinder heads to said cylinder block and a plurality of intake manifold bolts for fastening said intake manifold to said cylinder heads, said method comprising the steps of:

temporarily fastening said cylinder heads to said cylinder block by said cylinder head bolts;

temporarily fastening said intake manifold to said cylinder heads by said intake manifold bolts;

formally fastening said cylinder heads to said cylinder block by said cylinder head bolts; and formally fastening said intake manifold to said cylinder heads by said intake manifold bolts.

2. A method as claimed in claim 1, wherein said intake manifold bolts are loosened after temporarily fastening said intake manifold to said cylinder heads by said intake manifold bolts and before formally fastening said cylinder heads to said cylinder block by said cylinder head bolts.

3. A method as claimed in claim 2, wherein:

a first fastening force for temporarily fastening said cylinder head bolts is smaller than a second fastening force for formally fastening said cylinder head bolts;

a third fastening force for temporarily fastening said intake manifold bolts is larger than a fourth fastening force for formally fastening said intake manifold bolts; and said third fastening force is established so as to allow the positioning of said cylinder heads relative to said cylinder block and the positioning of said intake manifold relative to said cylinder heads in opposition to surface pressures between said cylinder block and said cylinder heads due to said first fastening force.

4. A method as claimed in claim 1, wherein said internal combustion engine is a V-type engine where said two cylinder banks are arranged in a substantial V form.

5. A method as claimed in claim 1, wherein said internal combustion engine is a parallel-type engine where said two cylinder banks are arranged in substantial parallel.

6. A method of fastening an intake manifold to cylinder heads of an internal combustion engine having two cylinder banks, said engine including a cylinder block having cylinders formed therein, said cylinder heads attached to said cylinder block for partially defining combustion chambers therein and said intake manifold mounted on said cylinder heads for distributing intake air into said cylinders, said method comprising the steps of:

temporarily fastening said cylinder heads to said cylinder block;

temporarily fastening said intake manifold to said cylinder heads by said intake manifold bolts;

formally fixing said cylinder heads to said cylinder block; and formally fixing said intake manifold to said cylinder heads.

* * * * *